US012466624B2

United States Patent
Scheibenstock et al.

(10) Patent No.: US 12,466,624 B2
(45) Date of Patent: Nov. 11, 2025

(54) CLOSURE CAP

(71) Applicant: ALPLA WERKE ALWIN LEHNER GMBH & CO. KG, Hard (AT)

(72) Inventors: Denis Scheibenstock, Hard (AT); Georg Süss, Raabs an der Thaya (AT); Jürgen Bickel, Dornbirn (AT); Peter Winghart, Oberstadion (DE); Franz-Michael Lässer, Lochau (AT); Matthias Dangl, Waidhofen an der Thaya (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 18/846,338

(22) PCT Filed: Mar. 14, 2023

(86) PCT No.: PCT/EP2023/056478
§ 371 (c)(1),
(2) Date: Sep. 12, 2024

(87) PCT Pub. No.: WO2023/174934
PCT Pub. Date: Sep. 21, 2023

(65) Prior Publication Data
US 2025/0187803 A1 Jun. 12, 2025

(30) Foreign Application Priority Data
Mar. 14, 2022 (CH) .......................... CH000271/2022

(51) Int. Cl.
*B65D 47/08* (2006.01)
*B65D 55/16* (2006.01)
(52) U.S. Cl.
CPC ...... *B65D 55/16* (2013.01); *B65D 2251/1008* (2013.01); *B65D 2401/30* (2020.05)

(58) Field of Classification Search
CPC ............... B65D 55/16; B65D 47/0809; B65D 47/0814; B65D 2401/30;
(Continued)

(56) References Cited

U.S. PATENT DOCUMENTS

| 12,246,896 B2 * | 3/2025 | Berroa Garcia ..... B65D 47/142 |
| 2008/0035681 A1 * | 2/2008 | Skillin ............... B65D 47/0819 222/556 |

(Continued)

FOREIGN PATENT DOCUMENTS

| EP | 3741703 A1 | 11/2020 | |
| KR | 20090005746 A * | 1/2009 | ......... B65D 41/3404 |
| WO | 2020227813 A1 | 11/2020 | |

OTHER PUBLICATIONS

International Search Report issued by the European Patent Office acting as the International Searching Authority in relation to International Application No. PCT/EP2023/056478 dated Jun. 14, 2023 (3 pages) along with English language translation (2 pages).

(Continued)

*Primary Examiner* — King M Chu
(74) *Attorney, Agent, or Firm* — Robert P. Michal, Esq.; Rimôn PC

(57) ABSTRACT

A closure cap for closing the pouring opening of a container includes a cylindrical threaded part which has an open rim, a first cylindrical shell, and an internal thread, which is formed on the interior of the shell and can interact with an external thread of a container neck delimiting the pouring opening; a security ring, which is designed to be held on a projection formed on the container neck. The closure cap includes a first retaining strip having a first and a second end, wherein the first end is rigidly connected to the open rim of the threaded part and the second end is rigidly connected to the security ring; and a second retaining strip, having a third and a fourth end, wherein the third end is rigidly connected (Continued)

Figure 1:
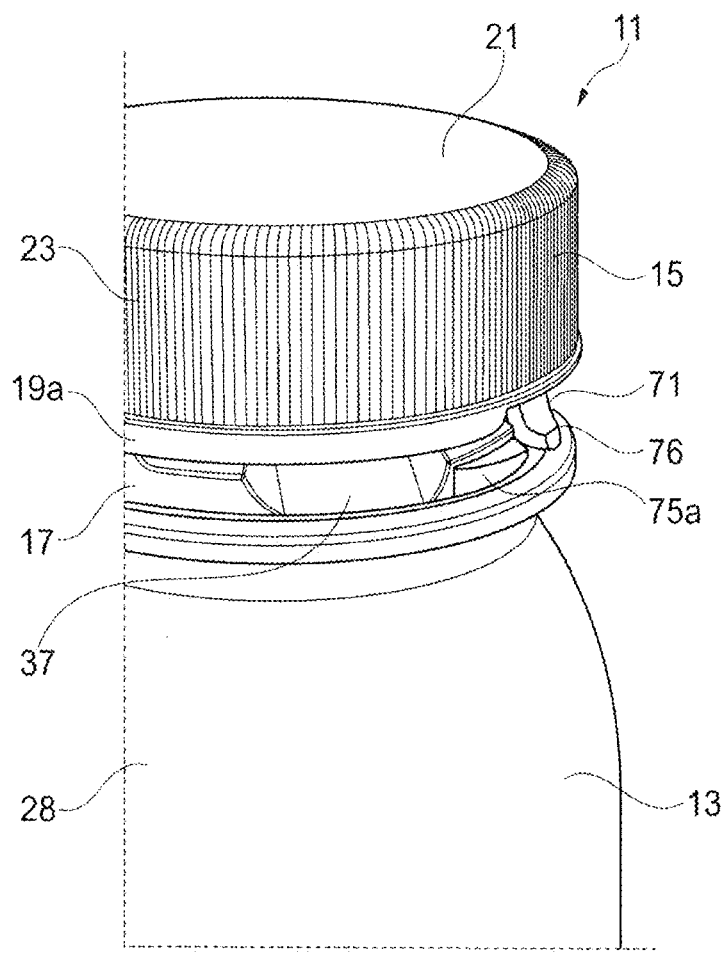

to the open rim of the threaded part and the fourth end is rigidly connected to the security ring.

23 Claims, 6 Drawing Sheets

(58) Field of Classification Search
CPC ........ B65D 2251/1008; B65D 41/3447; B65D 39/084; B65D 43/162; B65D 2543/00092; B65D 2543/00555; B65D 39/08; B65D 41/04; B65D 39/088; B65D 2543/00972
USPC ............... 215/237, 235; 220/838, 254.3, 837
See application file for complete search history.

(56) References Cited

U.S. PATENT DOCUMENTS

| | | | |
|---|---|---|---|
| 2008/0169261 A1* | 7/2008 | Druitt ................ | B65D 47/0809 |
| | | | 215/253 |
| 2011/0297682 A1* | 12/2011 | Kwon .................... | B65D 51/16 |
| | | | 220/268 |

OTHER PUBLICATIONS

Written Opinion of the International Searching Authority issued by the European Patent Office acting as the International Searching Authority in relation to International Application No. PCT/EP2023/056478 dated Jun. 14, 2023 (5 pages).

* cited by examiner

CLOSURE CAP

CROSS-REFERENCE TO RELATED APPLICATIONS

This application is a national phase entry under 35 U.S.C. 371 of PCT International Application No. PCT/EP2023/056478 filed Mar. 14, 2023, which claims priority to Swiss Patent Application No. CH000271/2022, filed Mar. 14, 2022, the disclosure of each of these applications is expressly incorporated herein by reference in their entirety.

FIELD OF THE INVENTION

The invention relates to a closure cap for closing the pouring opening of a container.

PRIOR ART

Closure caps which are captively held on the container and close the pouring opening thereof are known from the prior art in the field of plastic closure caps having a security strip. The holding function is also of great importance, since legal regulations will be enacted in the next few years under which closures of beverage bottles must be connected captively to the beverage bottle even when in the open state.

Closure caps which have two retaining strips, which connect a threaded part of the closure cap to a security ring of the closure cap, are also known. The two retaining strips can act as a hinge about which the threaded part can be folded away from the security ring or from the container to be closed off from a closure position into an open position. A engaging lug is formed on the open rim of the threaded part. With the engaging lug, the threaded part can be latched in the open position on the external thread of the bottle neck. The threaded part is thereby fixed in the open position and has very little interference in the pouring process.

However, the lug tolerates only a certain amount of tension from the retaining strips in the open position and tends to bend. This means the user receives little feedback when moving the threaded part into the open position. In addition, there are several sharp edges in the lug region which can cause injury to the user.

OBJECT OF THE INVENTION

The disadvantages of the prior art described give rise to the object of providing an improved captive closure cap which has improved haptics in terms of operation and safety.

DESCRIPTION

The object presented is achieved in a closure cap for closing the pouring opening of a container. Developments and/or advantageous alternative embodiments form the subject matter of the dependent claims.

The invention is preferably characterized in that the engaging lug has the shape of a first ramp, wherein the height of the first ramp increases in the radial direction starting from the open rim, and in that the groove is flanked by a second and third ramp, formed on the security ring, the heights of which decrease from the groove in the circumferential direction of the security ring. Since the engaging lug is a first ramp, the engaging lug is mechanically reinforced and can no longer bend under load. Under increased load, caused by higher tensile stresses in the retaining strips, the engaging lug does not yield. This means that the threaded part in the open position can assume an increased opening angle, which is not reduced again by the yielding of the engaging lug. An increased opening angle is desirable because it makes the container significantly more user-friendly when pouring out contents. The increased tensile stresses also lead to an improved snap-in function of the engaging lug in the open position, which improves the haptics during opening. This also allows the shell of the threaded part to strike the support ring of the container more strongly, which stabilizes the threaded part in the open position and can give the user acoustic feedback indicating that the threaded part has snapped into place. The first ramp also prevents any sharp edges and steps on the engaging lug, reducing the risk of injury and improving user safety.

The second and third ramps protect the first ramp and compensate for the excessive projection of the engaging lug from the outer contour of the closure cap. This also minimizes the risk of injury. In addition, it is conceivable that the threaded part rest on the second and third ramps in the open position, as a result of which the threaded part is stabilized in the open position and does not wobble.

In a particularly preferred embodiment of the invention, the first ramp has a ramp table at its open end. This flattened portion of the ramp prevents the first ramp from having a sharp edge that could lead to injuries. In addition, the threaded part can rest against the spout by the ramp table in the open position, which stabilizes the open position.

In another preferred embodiment of the invention, the first ramp is U-shaped with a first and second leg and a base, wherein the heights of the legs increase from the open rim, and the base is the ramp table. The U shape of the engaging lug meets all the requirements placed on the first ramp in a way that protects the material.

Expediently, a reinforcing rib is formed on the engaging lug between the first and second legs. This increases the mechanical stability of the U-shaped engaging lug, allowing the engaging lug to tolerate high bending forces without deforming.

It has proven expedient for the legs, the base, and the optional reinforcing rib to have rounded edges. This minimizes the risk of injury from the first engaging lug.

In another preferred embodiment of the invention, the first ramp is an all-over thicker portion. This embodiment allows for maximum mechanical stability of the engaging lug. Since this embodiment is free of recesses and ribs, and the entire engaging lug is thickened to form the first ramp, the negative impression can be easily created in an injection mold, and the engaging lug is accordingly easy to remove from the mold.

Expediently, the first ramp protrudes beyond the second and third ramps by 1 to 4 mm, and preferably by 1.5 to 2 mm. As a result, the engaging lug only slightly protrudes from the outer contour of the cap, and the engaging lug is still thick enough to ensure reliable snapping onto the spout.

It is advantageous for the first ramp to have a length of between 4 and 10 mm, and preferably between 5 and 7 mm. This length allows a high tensile stress to be built up in the two tension strips in the open position, which leads to the advantages described above, in particular an increased opening angle of the threaded part.

Advantageously, the first ramp has a height of between 3 and 6 mm, and preferably between 4 and 5 mm, at its highest point. The highest point is preferably defined by the ramp table. This height allows for the creation of a stable open position.

The invention is also preferably characterized in that the first and third ends are articulated to the open rim by a first and a second hinge. The hinges enable the threaded part to be pivoted relative to the first and second retaining strips about the hinges into the open position, whereby the transfer into the open position is simple and self-explanatory for the user. As a result, an inadvertent tearing of the threaded part from the security ring can also be avoided.

Expediently, the first rim is releasably connected to the open rim of the threaded part by at least one first predetermined breaking web, and the second rim is releasably connected to the security ring by at least one second predetermined breaking web. The third rim can also be releasably connected to the open rim of the threaded part by at least one third predetermined breaking web, and the fourth rim can be releasably connected to the security ring by at least one fourth predetermined breaking web. As a result, the retaining strips receive effective support in the axial direction, which is required for the closure cap to be pushed onto the spout without the retaining strips being compressed or destroyed.

Preferably, the first and third ends are connected to the security ring by a second or a fourth predetermined breaking web. By providing the two fourth predetermined breaking webs, the retaining strips are sufficiently supported and held so as not to be damaged when the cap is pushed onto the spout. Further third and fourth predetermined breaking webs can therefore be dispensed with, whereby plastics material can be saved.

It is also advantageous for the first and third ends to form a first opening angle of at least 4 degrees and at most 10 degrees, and preferably of at least 5 and at most 7 degrees, with respect to the center point of the closure cap as the apex, and for the second and fourth ends to form a second opening angle of at least 180 degrees and at most 240 degrees, and preferably of at least 200 and at most 220 degrees, with respect to the center point of the closure cap as the apex. By selecting these angle sizes, the first and second retaining strips are arranged on the security ring in a position in which they extend substantially tangentially along the spout when the threaded part is in the open position. As a result, the retaining strips move with the threaded part without catching on the spout when the threaded part is moved into the open position.

Expediently, the opening angle which the engaging lug forms together with the center point as the apex substantially corresponds to the first opening angle. By cutting the first and second retaining strips out of the security ring, the engaging lug is preferably cut free and the groove formed. It would also be conceivable for a greater distance to be provided between the first end of the first retaining strip and the engaging lug or the third end of the second retaining strip and the engaging lug than if the distance were formed by cutting out the retaining strips.

It is preferable for the first and second ends to form a third opening angle of at least 50 degrees and at most 80 degrees, and preferably of at least 60 and at most 70 degrees, with respect to the center point of the closure cap as the apex.

It is also preferable for the third and fourth ends to form a fourth opening angle of at least 50 degrees and at most 80 degrees, and preferably of at least 60 and at most 70 degrees, with respect to the center point of the closure cap as the apex. By choosing these third and fourth opening angles, the first and second retaining strips have a length which allows unscrewing, transferring the threaded part into the open position, and holding the threaded part in the open position with a high tensile stress (in combination with the dimensions of the first ramp). In combination with the first and second opening angles, the retaining strips are given the appropriate position on the security ring, in order to allow the above movements of the threaded part.

Expediently, the third and fourth opening angles are of equal size, as a result of which the first and second retaining strips are of equal length. The threaded part is thereby held in the open position with uniform tension.

Since the first, second, third, and fourth opening angles have a center point of a circle as apex, their angle sum must be 360 degrees.

In a preferred embodiment of the invention, the length of the first and second retaining strips is dimensioned in such a way that they are tensioned in the open position, and the threaded part is held in the open position. The retaining strips are preferably elastically tensioned, as a result of which the threaded part can be moved multiple times between the closure position and the open position. The increased tension of the retaining strips, caused by the dimensions of the retaining strips and the first engaging lug, allows the threaded part to be held at a large opening angle in the open position without wobbling.

A first and a second recess for receiving the first and second retaining strips is expediently provided on the rim, facing the first and second retaining strips, of the security ring. As a result, the first and second retaining strips can be molded from the security ring in a space-saving manner and without additional material expenditure. For example, the first and second retaining strips can be cut out of the security ring or molded during the production process of the closure cap.

It has proven to be expedient if an inwardly projecting inner cone, e.g., in the form of a sealing cylinder or a sealing ring, is formed on the base of the threaded part, and is designed to interact in a sealing manner with the inner wall of the spout in the closure position. The closure cap can therefore act as a so-called cone sealer and reliably seals the spout.

In a further preferred embodiment of the invention, the first and the second retaining strips have a width of between 3 mm and 7 mm, and preferably a width of between 4 mm and 5 mm. This dimensioning has the effect that the retaining strip is not unintentionally torn off-in particular, when the predetermined breaking webs are torn off. Furthermore, the closure cap does not become too high and can be joined in a sealed manner with standardized container necks having an outer thread.

The invention is also characterized in that the closure cap is designed to interact with a standardized spout with an outer thread and annular projection. The closure cap can therefore be placed on standardized container necks, in particular PET beverage bottles. Containers that are joined to the closure cap according to the invention therefore do not have to be specifically adapted to the closure cap.

The closure cap is expediently made of a plastics material, preferably HDPE (high-density polyethylene) or PP (polypropylene). The closure cap can therefore be produced with standard plastics materials from which known closure caps with a security ring are also produced.

In another preferred embodiment of the invention, the threaded part, the security ring, the retaining strips, the predetermined breaking webs and retaining webs, and the engaging lug are produced in one piece. As a result, the closure cap can be produced in an injection mold, without the need of further processing steps, to form the first and second retaining strips. Preferably, the inner cone is also produced in one piece together with the other parts of the closure cap.

In a particularly preferred embodiment of the invention, the security ring has slots, arranged distributed over the circumference, with an upper edge and a lower edge, wherein the upper edge is formed by a circular-arc-shaped section of the security ring, and the lower edge is formed by a wall section inclined inwardly in the radial direction, and the lower edge of each slot forms the projections, whereby engaging means for form-fitting engagement with the annular projection are formed. Since the engagement means in the form of the inwardly inclined wall sections are not on the entire circumference of the security ring, and since slots are also present, by the molding of which the amount of material used is even further reduced, the material requirement for plastics can be significantly reduced by up to 5%. In addition, the wall section is immovable inwards in the radial direction, whereby the security ring is held on the annular projection and cannot be pulled over it until the security ring is stretched along its circumference. The security ring is held on the annular projection by the wall sections such that the predetermined breaking elements safely tear before the holding force of the wall sections is overcome. This stable form fit also allows the security ring not to be pulled off the spout when the threaded part is moved to the second position, even though a high tensile stress is built up in the retaining strips during this movement. However, the wall sections are flexible or movable outwards in the radial direction. As a result, the wall sections can be demolded from the injection mold or the injection-molding tool with little exertion of force. For the same reason, the application force for pressing the closure cap is significantly reduced in comparison to the prior art. Expansion of the security ring, which can lead to permanent damage to the closure cap, is largely prevented during demolding and pressing.

A further aspect of the invention relates to a container having a container body, a spout adjoining the container body, an outer thread formed on the spout, and a closure cap in accordance with the above description.

In another embodiment, the engaging lug latches into the external thread in the open position, and the first shell rests against the second and third ramps. The threaded part is thereby fixedly held in the open position so as not to wobble.

In a further embodiment, the engaging lug latches into the external thread in the open position, and the first shell rests against the support ring. Dimensions are conceivable in which the first shell rests against the second and third ramps and the support ring, thereby maximizing the stability of the threaded part in the open position in combination with the increased tensile stress in the retaining strips.

Figure 2:
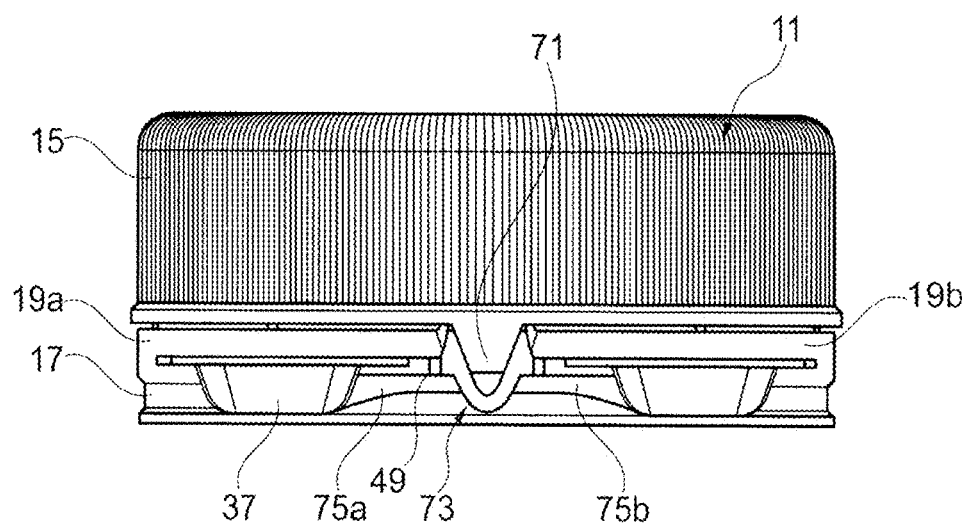
Figure 3:
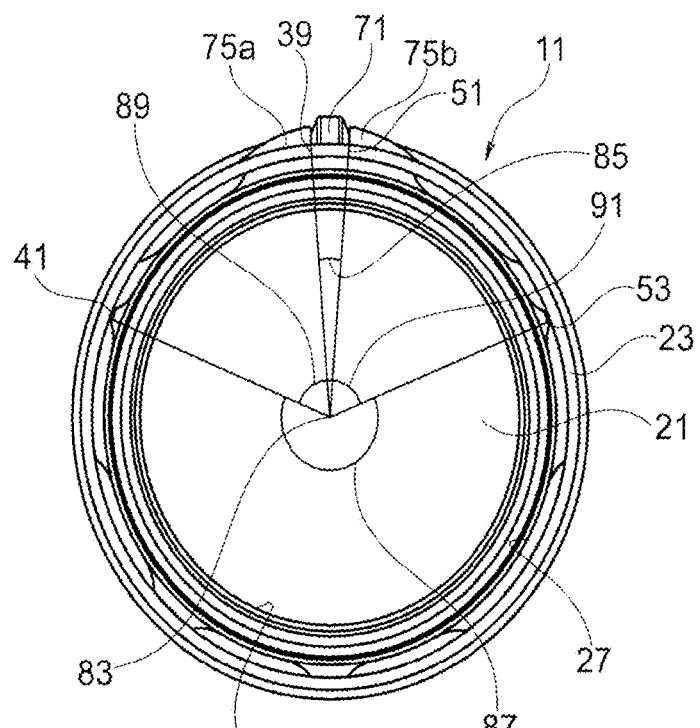
Figure 4:
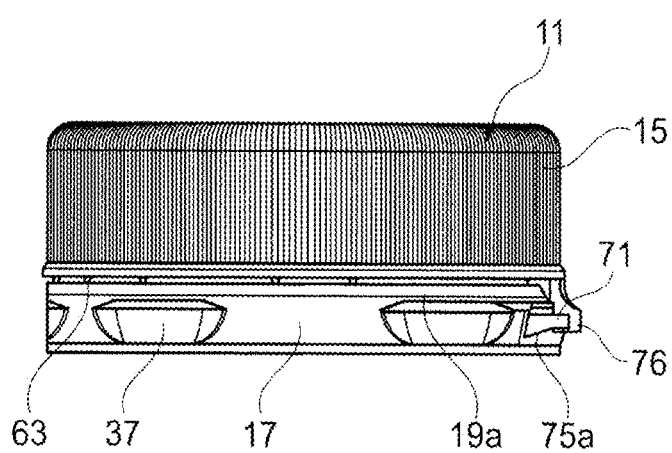
Figure 5:
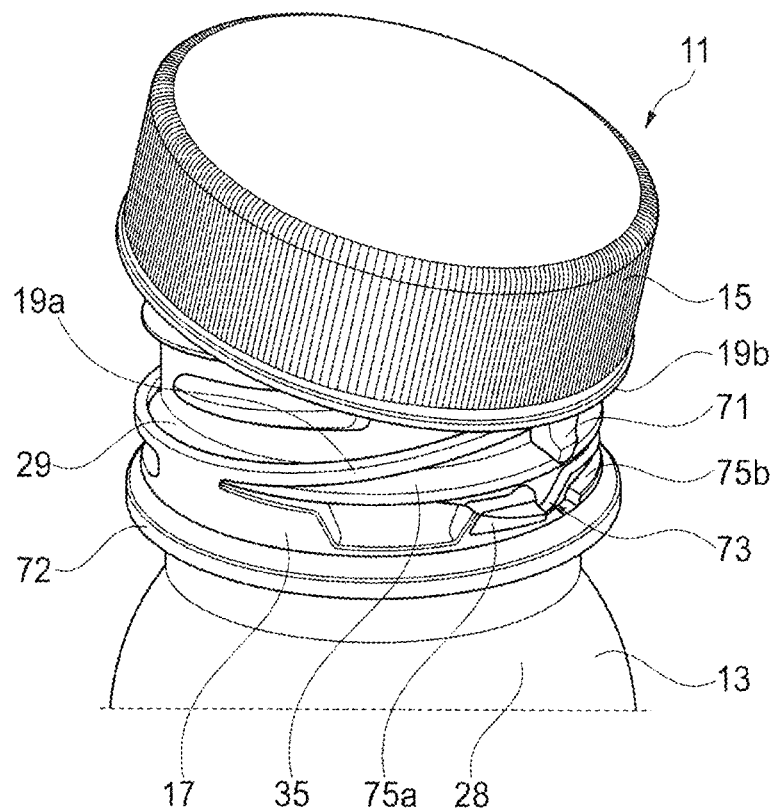
Figure 6:
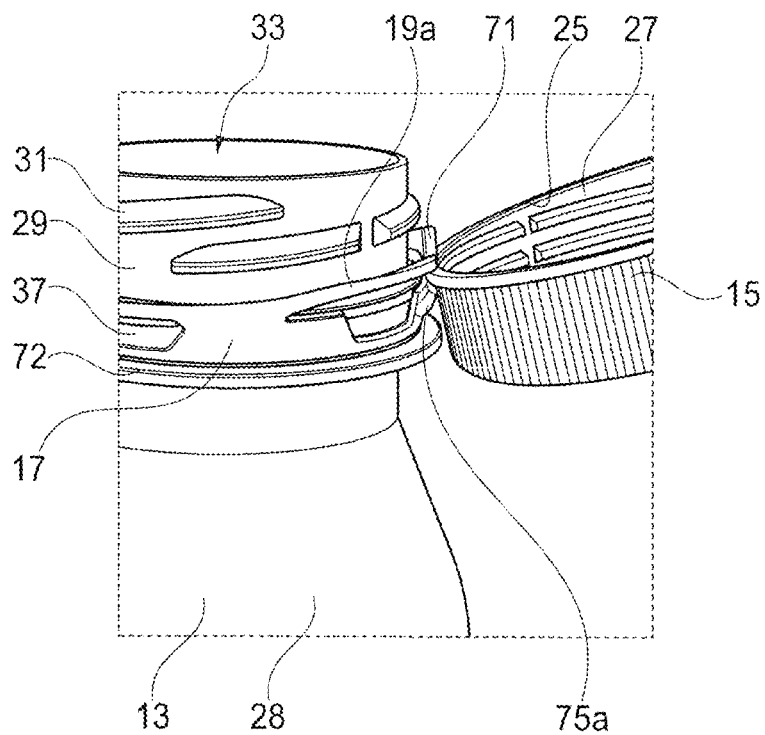
Figure 7:
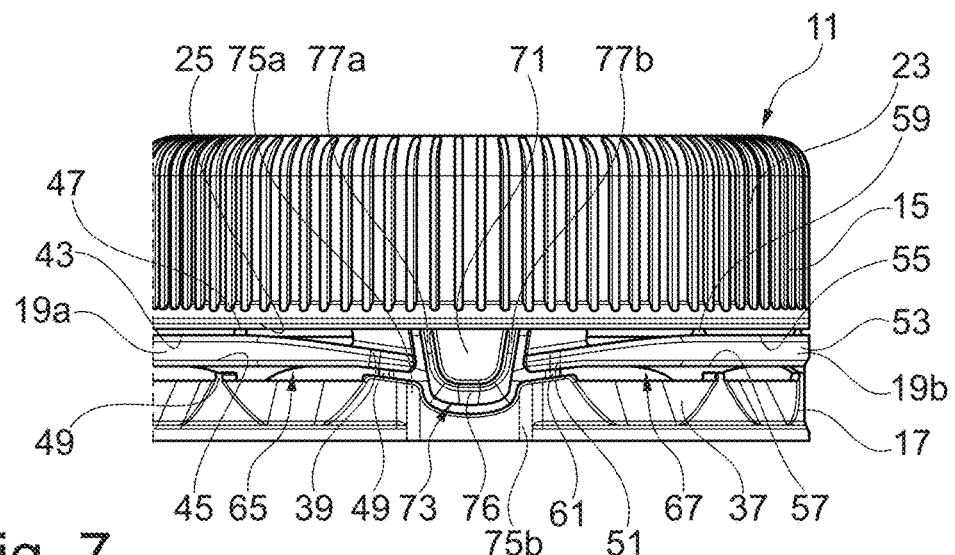
Figure 8:
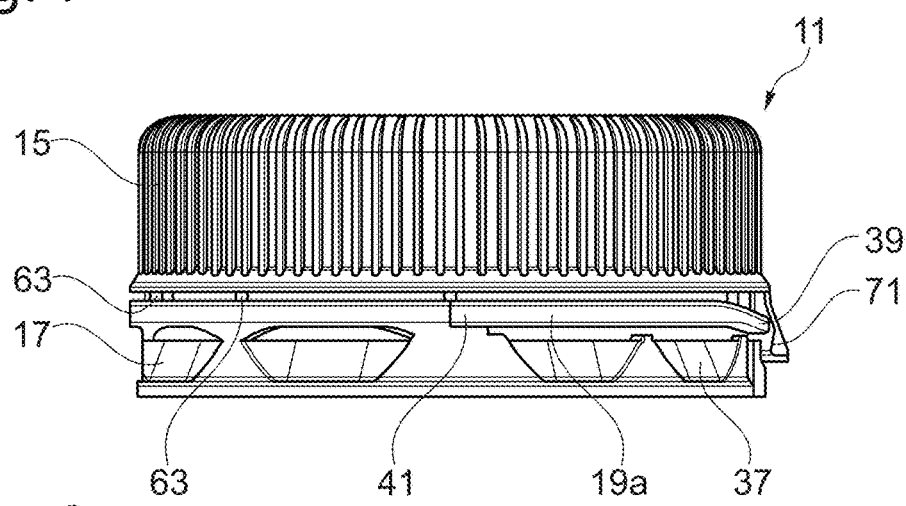
Figure 9:
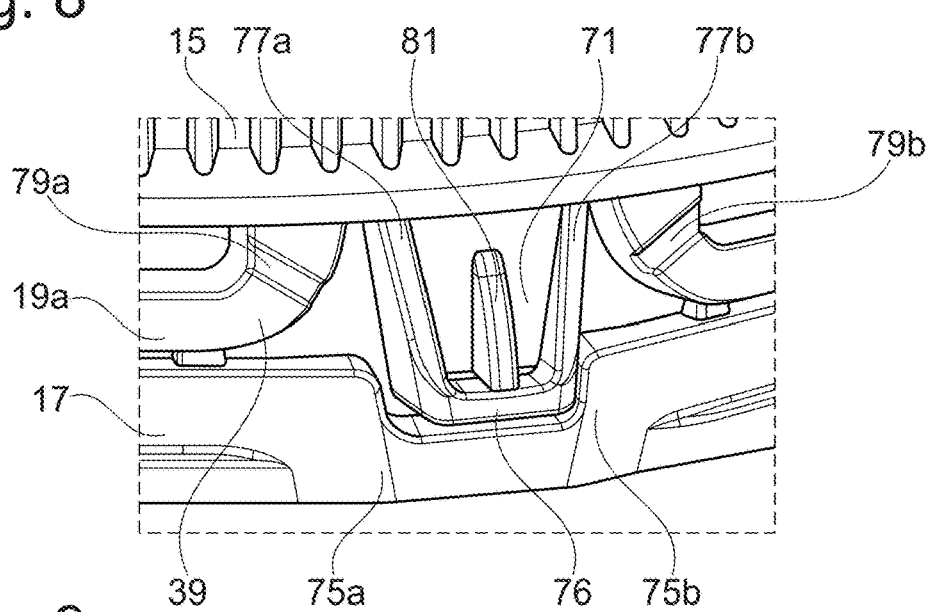
Figure 10:
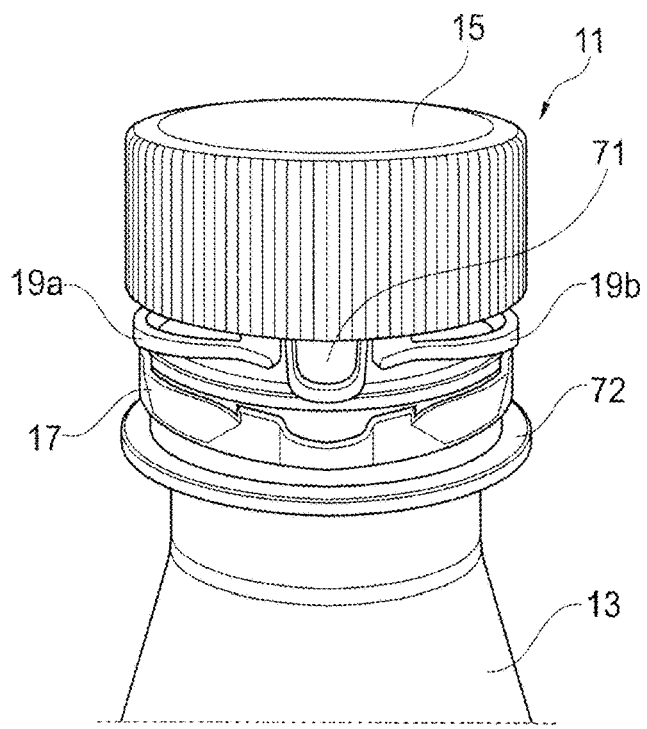
Figure 11:
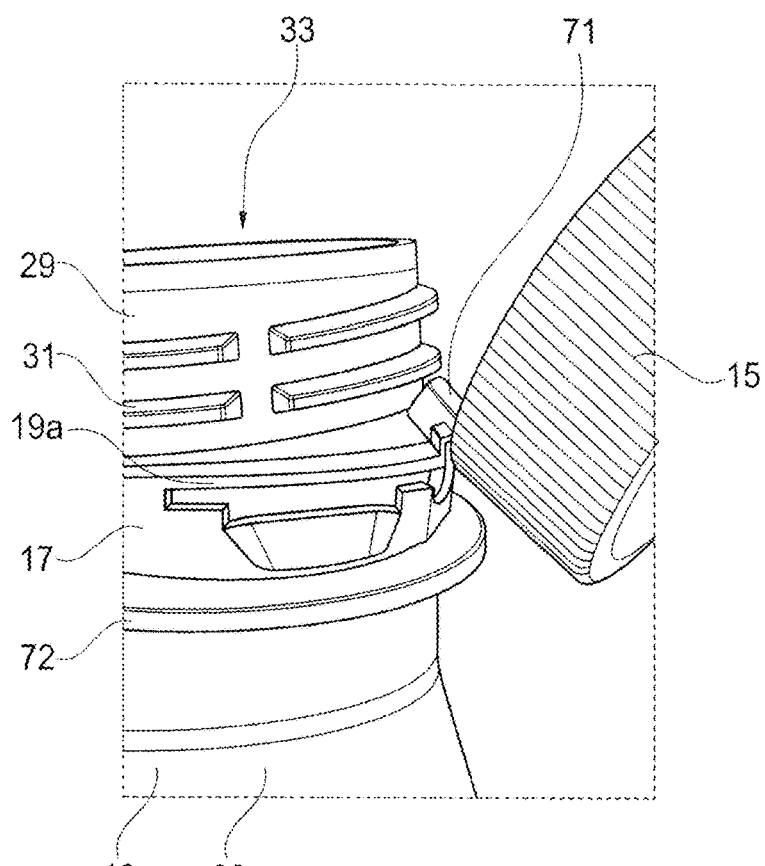
Figure 12:
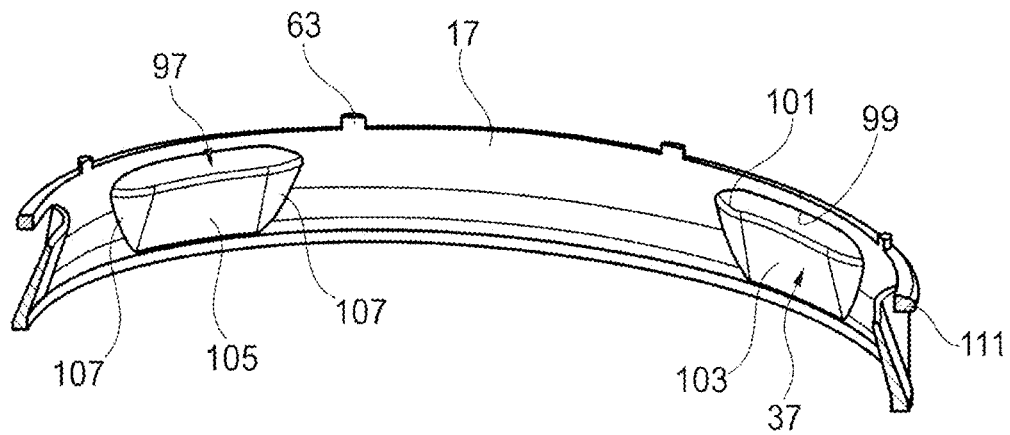

Further advantages and features become apparent from the following description of two exemplary embodiments of the invention with reference to the schematic representations. In the figures, in a representation that is not to scale:

FIG. 1: is a perspective view of a container closure in the closure position on a container in a first embodiment;

FIG. 2: is a front view of the closure from FIG. 1;

FIG. 3: is a bottom view of the closure from FIG. 1;

FIG. 4: is a side view of the closure from FIG. 1;

FIG. 5: is a perspective view of the closure partially unscrewed from the container;

FIG. 6: is a perspective view of the closure from FIG. 1 in the open position;

FIG. 7: is a front view of the closure in a second embodiment and in the closure position;

FIG. 8: is a side view of the closure from FIG. 7;

FIG. 9: is a detail view of the engaging lug;

FIG. 10: is a perspective view of the closure from FIG. 7 partially unscrewed from the container;

FIG. 11: is a perspective view of the closure from FIG. 7 in the open position;

FIG. 12: a detail view of the security ring; and

Figure 13:
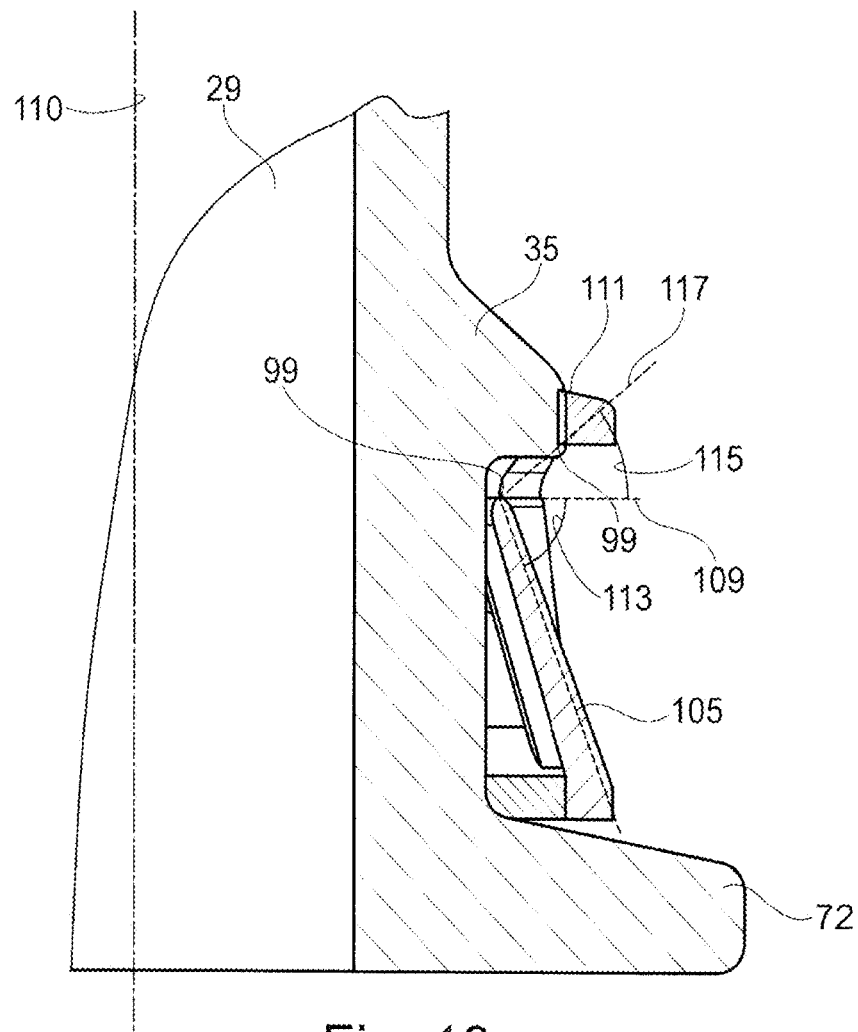

FIG. 13: is a sectional view of the security ring from FIG. 12, depicting inclination angles.

FIGS. 1 to 6 and 7 to 11 show a closure cap in a first or second embodiment, which is denoted as a whole by reference sign 11. The closure cap 11 is held captive on a container 13—for example, on a PET bottle. The container 13 is indicated in FIGS. 1, 5, 6, 10, and 11. The closure cap 11 comprises a cylindrical threaded part 15, a security ring 17, and a first and a second retaining strip 19a, 19b. The first and second retaining strips 19a, 19b are circular and formed from the security ring 17.

The threaded part 15 comprises a bottom 21 and a first cylindrical shell 23 having an open rim 25. An internal thread 27 is formed on the inside of the shell 23. The container 13 comprises a container body 28 and a spout 29 adjoining the container body 28. The spout 29 is designed as a second cylindrical shell. An external thread 31 is formed on the spout 29 and interacts with the internal thread 27. As a result, the threaded part 15 can be screwed onto and unscrewed from the spout 29. The closure cap 11 closes the pouring opening 33, which is provided inside the spout 29 and is delimited thereby.

The security ring 17 is held in a form fit on the spout 13. For this purpose, an annular projection 35 is formed on the outside of the spout 29 and may be engaged from below by projections 37 formed on the inside of the security ring 17 (FIG. 13). The security ring 17 is rotatable relative to the spout 29.

The first retaining strip 19a has a first end 39 and a second end 41. The first end 39 is fixedly connected to the open rim 25. The second end 41 is fixedly connected to the security ring 17. As a result, the closure cap 11 is captively held on the container 13. Furthermore, the first retaining strip 19a has a first rim 43 and a second rim 45. The first rim 43 is connected to the open rim 25 by at least one first predetermined breaking web 47, and the second rim 45 is releasably connected to the security ring 17 by at least one second predetermined breaking web 49.

The second retaining strip 19b has a third end 51 and a fourth end 53. The third end 51 is rigidly connected to the open rim 25. The fourth end 53 is fixedly connected to the security ring 17. As a result, the closure cap 11 is additionally captively held on the container 13. Furthermore, the second retaining strip 19b has a third rim 55 and a fourth rim 57. The third rim 55 is connected to the open rim 25 by at least one third predetermined breaking web 59, and the fourth rim 57 is releasably connected to the security ring 17 by at least one fourth predetermined breaking web 61.

In addition, the security ring 17 is held at the open rim 25 by a plurality of security webs 63. The security webs are preferably arranged at regular intervals on the security ring 17. It goes without saying that the regions occupied by the first and second retaining strips 19a, 19b on the security ring 17 are free of security webs 63.

It is preferred if the first and second retaining strips 19a, 19b have a width of between 4 mm and 5 mm so that they are sufficiently stable.

According to FIGS. 1, 2, 4, 7, and 8, the threaded part 15 is in a closure position in which it is pushed or screwed onto the spout 29. During unscrewing from the spout 29, the first and second retaining strips 19a, 19b are pulled upwards in the axial direction and are also elastically expandable if necessary so that the threaded part 15 can be unscrewed and folded away from the spout 29.

A first and a second recess 65, 67 are provided on the security ring 17. The first and the second retaining strips 19a, 19b are received in the first or the second recesses 65, 67. This makes it possible to produce the first and second retaining strips 19a, 19b directly from the security ring 17—for example, by being cut out of the security ring.

At the open rim 25, an engaging lug 71 protrudes adjacently to the first or third end 39, 51. In the closed position, the engaging lug 71 protrudes into a groove 73. The engaging lug has the shape of a first ramp 71, wherein the height of the ramp increases in the radial direction starting from the open rim 25. The ramp shape strengthens the lug 71, whereby the tensile stress in the retaining strips 19a, 19b can be increased in the open position without the lug 71 yielding. This increased stress leads to a larger opening angle of the threaded part 15 in the open position, since it is raised further from the retaining strips. The lug also snaps more obviously onto the spout 29 in the open position, which improves ease of use. In addition, the ramp shape conceals sharp edges on the engaging lug, which greatly reduces the risk of injury to the user and improves the safety of the closure cap 11.

Second and third ramps are formed on the security ring 17, which flank the groove 73. The heights of the second and third ramps 75a, 75b decrease in the circumferential direction starting from the groove 73. The ramps 75a, 75b protect the engaging lug 71 in the closure position, since it only slightly projects beyond the ramps 75a, 75b. A large change in wall thickness between the security ring 17 and the engaging lug 71 is thus prevented. Since the ramps 75a, 75 partially cover the engaging lug 71, the risk of injury is also further reduced. In the open position, the threaded part 15 can rest against the ramps 75a, 75b, improving the haptics when opening and locking the threaded part. In addition, the shell 23 can rest against the support ring 72, which, in a container 13, in particular a PET bottle, is usually present at the transition between the spout 29 and the container body 28. A ramp table 77 is formed at the open end of the first ramp 71. In the closure position of the threaded part 15, the ramp table extends in a vertical plane. The ramp table 76 additionally stabilizes the threaded part in the open position, thereby preventing undesirable wobbling of the threaded part in addition to the increased tensile stress in the retaining strips 19a, 19b.

FIGS. 1 to 6 show a first embodiment of the engaging lug 71. The first ramp 71 is, as can be seen in the drawings, an all-over thicker portion. It therefore has no depressions, ribs, or elevations. This makes it extremely stable, but it requires more plastics material to form it than the second embodiment described in the next paragraph.

In the second embodiment, as shown in FIGS. 7 to 11, the first ramp 71 is U-shaped with two legs 77a, 77b. The legs 77a, 77b increase in height starting from the open rim 25. The base of the "U" forms the ramp table 76. In addition, a reinforcing rib can be formed between the two legs 77a, 77b. Preferably, all the edges of the first ramp 71 are rounded to minimize the risk of injury.

The first ramp projects beyond the second and third ramps by 1 to 4 mm, and preferably by 1.5 to 2 mm. This gives the ramp table 76 an optimal height for latching in the open position. The length of the first ramp of between 4 and 10 mm and preferably between 5 and 7 mm also contributes to improving latching.

The first and third ends 39, 51 are articulated to the open rim 25 with a first and a second hinge 79a, 79b. By means of the hinges, the threaded part 15 can be moved precisely and nevertheless smoothly into the open position, in that the threaded part 15 can be pivoted relative to the first and the second retaining strips 19a, 19b.

The first and third ends 39, 51 are connected to the security ring 17 with a second or fourth predetermined breaking web 49, 61. The closure cap 11 can therefore be pushed onto the spout 29 without parts of the closure cap 11 being damaged. To increase the stability, even more first, second, third, and fourth predetermined breaking webs can also be provided on the retaining strips 19a, 19b.

Since the closure cap 11 is rotationally symmetrical, it has a center point 83. The center point 83 lies in the imaginary plane between the open rim 25 and the security ring 17. The first end 39 and the third end 51 form a first opening angle 85 of at least 4 degrees and at most 10 degrees, and preferably of at least 5 and at most 7 degrees, with respect to the center point 83 as the apex. The second end 41 and the fourth end 53 form a second opening angle 87 of at least 180 degrees and at most 240 degrees, and preferably of at least 200 and at most 220 degrees, with respect to the center point 83 as the apex.

The first end 39 and the second end 41 form a third opening angle 89 of at least 50 degrees and at most 80 degrees, and preferably of at least 60 and at most 70 degrees, with respect to the center point of the closure cap as the apex. The third end 51 and the fourth end 53 form a fourth opening angle 91 of at least 50 degrees and at most 80 degrees, and preferably of at least 60 and at most 70 degrees, with respect to the center point 83 as the apex. It goes without saying that the sum of the first, second, third, and fourth aperture angles 85, 87, 89, 91 must be 360 degrees, since the first, second, third, and fourth aperture angles have the circle center 83 as the vertex. By selecting the first, second, third, and fourth opening angles, it is possible for the first and second retaining strips 19a, 19b to have a certain length which enables the functions described further above of the closure cap 11 in combination with the engaging lugs.

Expediently, the third and fourth opening angles 89, 91 are of equal size, which is equivalent to the first and second retaining strips 19a, 19b being of equal length. The first and second retaining strips 19a, 19b are preferably carved out of the security ring 17. The closure cap 11 can therefore act as a so-called cone sealer and reliably seals the spout 29.

The closure cap 11 is made of a plastics material. Preferred plastics include, inter alia, PP and HDPE.

A sealing cone 93 is formed on the bottom 21 of the threaded part 25 in a known manner and sealingly interacts with the spout 29 in the closure position (FIG. 3).

If the closure cap 11 is pressed onto the spout 29, the pouring opening 33 is closed by the closure cap 11, and the closure cap 11 is in the closure position. When the threaded part 15 is unscrewed from the spout 29, the first, second, third, and fourth predetermined breaking webs 47, 49, 59, 61 and the security webs 63 break.

FIGS. 5 and 10 each show a position of the threaded part 15 in which the threaded part 15 has been twisted on the spout 29, and the predetermined breaking webs and security webs begin to tear. If the threaded part 15 is completely unscrewed from the spout 29, all predetermined breaking and security webs are broken, and the threaded part 15 can be pivoted into the open position.

After unscrewing, the threaded part 15 can be pivoted into the open position about the hinges 79a, 79b. The engaging lug 71 is arranged in a position in which it is self-explanatory that it is to be latched to the spout or the external thread 31. In the open position, the threaded part is held captive on the spout 29 and is not in the way when pouring filling material. Due to the latching, the security ring 17 is fixed to the spout in the direction of rotation and cannot be rotated. This prevents the closure cap 11 from turning into the filling material flow during pouring. The stable engaging lug 71 allows for a large opening angle, since it does not bend under the tensile stress of the retaining strips 19a, 19b. The shell 23 preferably rests against the first and second ramps 75a, 75b and the support ring 72, and the ramp table 76 rests against the spout 29, thereby stabilizing the threaded part 15 in the open position.

The projections 37 can be designed in accordance with the following description of FIGS. 12 and 13. Slots 97 are provided in the security ring in a manner distributed over the circumference of the security ring 17. The slots 97 each have an upper edge 99 and a lower edge 101. The upper edge 99 is formed by a circular-arc-shaped section of the security ring 17. The lower edge 101 corresponds to the free rim of a wall section 103 inclined inwards in the radial direction. Due to the inward inclination of the wall section 103, the lower edge 101 has a smaller radius than the security ring 17 and can thereby abut an abutment (annular projection 35) of the spout 29 when the threaded part 15 is unscrewed from the spout 29. The abutment is realized by the annular projection 35, which is formed below the outer thread 31 on the spout 29. When the threaded part 15 is unscrewed, the lower edge 99 engages in a form fit on the projection 35, as a result of which the security ring 17 is reliably held on the annular projection 35 even under high axial forces. This increased holding force of the security ring 17 is also important in this case due to the increased tensile stress in the retaining strips in the open position.

Each wall section 101 has a first subsection 105 and two second subsections 107. The first subsection 105 represents an inwardly folded shell section and is preferably designed to be flat. The second subsections 107 adjoin the inward facing sides of the first subsection 105 and connect it to the security ring 17. The second subsections 107 can be curved or flat and face one another obliquely inwards. The lower edge 101 of the slot 97 corresponds to the free rims of the first portion 105 and of the second portions 107, and lies in a plane 109 shown in FIG. 13. The plane 109 is preferably oriented perpendicularly to the axis of rotation 110 of the spout 29. These described design features of the wall section 103 have the advantage that the wall section 103, with the entire lower edge 101, can rest against the annular projection 35 and, in the manner of a barb, not yield in the event of an axial tensile force upwards. As a result, the security ring 17 is held non-releasably against the projection 35 or can be removed from the projection 35 only by being destroyed. A movement of the first subsection 105 inwards in the radial direction is prevented by provision of the second subsections 107. However, a movement of the first subsection 105 outwards in the radial direction is possible. This movement is flexible, and after being pressed radially outwards, the wall section 103 returns to its inwardly inclined home position. This has the further advantage that the security ring 17 can be easily demolded and can be pressed together with the threaded part 15 onto the spout 29 with little force. As a result of the flexibility of the wall section 103, the demolding from an injection mold and the pressing onto the spout 29 can take place without the risk of damaging the wall section 103.

It is preferable for the inclined wall sections 103 to have a lesser wall thickness than the remaining security ring 17. FIG. 13 shows that the region of the lower edge 101 has the smallest wall thickness. The above-described flexibility of the wall section 103 radially outwards is thereby further improved. The wall thickness of the wall section 103 increases linearly downwards starting from the lower edge 101.

FIGS. 12 and 13 show the security ring 17 without the threaded part 15. FIGS. 12 and 13 clearly show that an annular bead 111 on which the upper edges 99 rest is formed above the slots 97 on the security ring 17.

A first and a second inclination angle 113, 115 are marked in FIG. 13. The first inclination angle 113 indicates the inclination of the first subsection 105 with respect to the plane of the lower edge 101. The first inclination angle 113 has a magnitude of between 60 and 80 degrees, and preferably between 65 and 75 degrees. The greater the first inclination angle 113, the better the stability of the wall sections 103 with respect to vertical force effects or axial tensile forces caused by the unscrewing of the threaded part 15. However, the first inclination angle 113 may not become too large, since otherwise the annular projection 35 cannot be sufficiently engaged.

The second inclination angle 115 indicates the inclination of the slot 97 with respect to the plane of the lower edge 111. The connecting line 117, which represents the inclination of the slot 97, is a connection of the upper edge 99 to the lower edge 101 in a plane spanned by the axis of rotation 110 and the connecting line 117. The second inclination angle 115 is enclosed by the connecting line 117 and the plane 109. The second inclination angle 115 has a magnitude of between 30 and 50 degrees, and preferably between 35 and 45 degrees. The greater the second inclination angle 115, the easier it is to demold the security ring 17.

LIST OF REFERENCE SIGNS

11 Closure cap
13 Container
15 Threaded part
17 Security ring
19 First retaining strip, second retaining strip
21 Bottom of the threaded part
23 First cylindrical shell
25 Open rim
27 Internal thread
28 Container body
29 Spout, second cylindrical shell
31 External thread
33 Pouring opening
35 Annular projection
37 Protrusions
39 First end of the first retaining strip
41 Second end of the first retaining strip
43 First rim of the first retaining strip
45 Second rim of the first retaining strip
47 First predetermined breaking web
49 Second predetermined breaking web
51 Third end of the second retaining strip
53 Fourth end of the second retaining strip
55 Third rim of the second retaining strip
57 Fourth rim of the second retaining strip
59 Third predetermined breaking web
61 Fourth predetermined breaking web
63 Security webs
65 First recess
67 Second recess
71 Engaging lug, first ramp
72 Support ring
73 Groove
75a, 75b Second ramp, third ramp 76 Ramp table, base of the U-shaped ramp
77a, 77b First leg, second leg
79a, 79b First hinge, second hinge
81 Reinforcing rib
83 Center point of the closure cap
85 First opening angle
87 Second opening angle
89 Third opening angle
91 Fourth opening angle
93 Sealing cone
97 Slots
99 Upper edge
101 Lower edge
103 Wall section

The invention claimed is:

1. A closure cap for closing the pouring opening of a container, comprising:
 a cylindrical threaded part having an open rim, a first cylindrical shell, and an internal thread, formed on the inside of the shell, which can interact with an external thread of a container neck delimiting the pouring opening,
 a security ring designed to be held on a projection formed on the container neck,
 a plurality of security webs which releasably connect the security ring to the open rim,
 a first retaining strip having a first and a second end and a first and second rim, wherein the first end is fixedly connected to the open rim of the threaded part, the second end is fixedly connected to the security ring,
 a second retaining strip having a third and a fourth end and a third and fourth rim, wherein the third end is rigidly connected to the open rim of the threaded part, the fourth end is rigidly connected to the security ring,
 a engaging lug which protrudes from the open rim adjacently to the first or third end, and
 a groove, provided in the security ring, into which the engaging lug projects,
 wherein it is possible to fold the threaded part from a closure position, in which it closes the pouring opening, into an open position, in which it fully opens the pouring opening, and vice versa,
 wherein
 the engaging lug has the shape of a first ramp, wherein the height of the first ramp increases in the radial direction starting from the open rim, and
 the groove is flanked by a second and third ramp, formed on the security ring, the heights of which decrease from the groove in the circumferential direction of the security ring.

2. The closure cap according to claim 1, wherein the first ramp has a ramp table at its open end.

3. The closure cap according to claim 2, wherein the first ramp is U-shaped with a first and second leg and a base, wherein the heights of the legs increase starting from the open rim, and the base is the ramp table.

4. The closure cap according to claim 3, wherein a reinforcing rib is formed on the engaging lug between the first and second legs.

5. The closure cap according to claim 4, wherein the legs, the base, and the optional reinforcing rib have rounded edges.

6. The closure cap according to claim 1, wherein the first ramp is an all-over thicker portion.

7. The closure cap according claim 1, wherein the first ramp projects beyond the second and third ramps by 1 to 4 mm.

8. The closure cap according to claim 1, wherein the first ramp has a length of between 4 and 10 mm.

9. The closure cap according to claim 1, wherein the first ramp has a height of between 3 and 6 mm, at its highest point.

10. The closure cap according to claim 1, wherein the first and third ends are articulated to the open rim by a first and second hinge.

11. The closure cap according to claim 1, wherein the first rim is releasably connected to the open rim of the threaded part by at least one first predetermined breaking web, and the second rim is releasably connected to the security ring by at least one second predetermined breaking web.

12. The closure cap according to claim 1, wherein the third rim is releasably connected to the open rim of the threaded part by at least one third predetermined breaking web, and the fourth rim is releasably connected to the security ring by at least one fourth predetermined breaking web.

13. The closure cap according to claim 1, wherein the first and third ends form a first opening angle of at least 4 degrees and at most 10 degrees, and preferably of at least 5 and at most 7 degrees, with respect to the center point of the closure cap as the apex, and
 the second and the fourth ends form a second opening angle of at least 180 degrees and at most 240 degrees, with respect to the center point of the closure cap as the apex.

14. The closure cap according to claim 1, wherein the opening angle which encloses the engaging lug with the center point as the apex substantially corresponds to the first opening angle.

15. The closure cap according to claim 1, wherein the first and the second retaining strips are the same length.

16. The closure cap according to claim 1, wherein the length of the first and second retaining strips is dimensioned in such a way that they are tensioned in the open position, and the threaded part is held in the open position.

17. The closure cap according to claim 1, wherein a first and second recess for receiving the first and second retaining strips is provided on the rim, facing the first and second retaining strips of the security ring.

18. The closure cap according to claim 1, wherein the first and second retaining strips have a width of between 3 mm and 7 mm.

19. The closure cap according to claim 1, wherein an inwardly projecting inner cone, e.g., in the form of a sealing cylinder or a sealing ring, is integrally formed on the bottom of the threaded part and is designed to sealingly interact with the inner wall of the container neck in the closure position.

20. The closure cap according to claim 1, wherein the security ring has slots, arranged distributed over the circumference, with an upper edge and a lower edge, wherein the upper edge is formed by a circular-arc-shaped section of the security ring, and the lower edge is formed by a wall section inclined inwardly in the radial direction, and in that the lower edge of each slot forms projections, whereby engagement means are formed for a form-fitting engagement with the annular projection.

21. A container comprising:
 a container body,
 a container neck adjoining the container body,
 an outer thread formed on the container neck, and
 a support ring formed at the transition from the container body to the container neck, and
 a closure cap for closing a pouring opening provided within the container neck, the closure cap having:
a cylindrical threaded part having an open rim and an inner thread, which can interact with the outer thread of a container neck of the container,
a security ring designed to be held on a projection formed on the container neck,
a plurality of security webs, which releasably connect the security ring to the open rim, and
a first retaining strip having a first and a second end and a first and second rim, wherein the first end is rigidly connected to the open rim of the threaded part, the second end is rigidly connected to the security ring, and
a second retaining strip having a third and a fourth end and a third and fourth rim, wherein the third end is rigidly connected to the open rim of the threaded part, the fourth end is rigidly connected to the security ring,
wherein a circular web section of the security ring is formed between the first and the second ends, and
the threaded part can be folded from a closure position, in which it closes the pouring opening, into an open position, in which it fully opens the pouring opening, and vice versa,
wherein
the closure cap is a closure cap according to claim 1.

22. The container according to claim 21, wherein, in the open position, the engaging lug latches into the external thread, and the first shell rests against the second and third ramps.

23. The container according to claim 21, wherein, in the open position, the engaging lug latches into the external thread, and the first shell rests against the support ring.

* * * * *